(12) United States Patent
Li et al.

(10) Patent No.: US 12,284,037 B2
(45) Date of Patent: Apr. 22, 2025

(54) METHOD AND APPARATUS FOR PDCCH REPETITION

(71) Applicant: Lenovo (Beijing) Ltd., Beijing (CN)

(72) Inventors: Yingying Li, Haidian District (CN); Yuantao Zhang, Dongcheng District (CN); Hongmei Liu, Changping District (CN); Zhi Yan, Xicheng District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 349 days.

(21) Appl. No.: 17/911,161

(22) PCT Filed: Mar. 13, 2020

(86) PCT No.: PCT/CN2020/079263
§ 371 (c)(1),
(2) Date: Sep. 13, 2022

(87) PCT Pub. No.: WO2021/179299
PCT Pub. Date: Sep. 16, 2021

(65) Prior Publication Data
US 2023/0163879 A1    May 25, 2023

(51) Int. Cl.
*H04L 1/08* (2006.01)
*H04W 72/23* (2023.01)
*H04W 76/20* (2018.01)

(52) U.S. Cl.
CPC .............. *H04L 1/08* (2013.01); *H04W 72/23* (2023.01); *H04W 76/20* (2018.02)

(58) Field of Classification Search
None
See application file for complete search history.

(56) References Cited

U.S. PATENT DOCUMENTS

| | | | |
|---|---|---|---|
| 2016/0006546 A1* | 1/2016 | Yi | H04W 72/0453 370/329 |
| 2020/0008235 A1 | 1/2020 | Sarkis et al. | |

(Continued)

FOREIGN PATENT DOCUMENTS

| | | |
|---|---|---|
| CN | 108432198 A | 8/2018 |
| CN | 108432314 A | 8/2018 |

(Continued)

OTHER PUBLICATIONS

LG Electronics , "Discussion on search space design", 3GPP TSG RAN WG1 Meeting NR#3, R1-1715871, Nagoya, Japan [retrieved Oct. 11, 2022]. Retrieved from the Internet <https://www.3gpp.org/ftp/TSG_RAN/WG1_RL1/TSGR1_AH/NR_AH_1709/Docs/>., Sep. 2017, 10 Pages.

(Continued)

*Primary Examiner* — Clemence S Han
(74) *Attorney, Agent, or Firm* — FIG. 1 Patents

(57) ABSTRACT

Embodiments of the present application are related to a method and apparatus for PDCCH repetition. A method according to an embodiment of the present application includes: receiving control channel element (CCE) aggregation level (AL) information in a search space set configuration; determining a scaling factor for each of repetition levels of a maximum repetition number, wherein the maximum repetition number corresponds to a total number of monitor occasions (MOs) within a set of MOs; computing a number of PDCCH candidates to be monitored for each of the repetition levels based on the CCE AL information and the scaling factor for each of the repetition levels; and receiving a control signal on the PDCCH candidates.

20 Claims, 11 Drawing Sheets

| Repetition level / CCE aggregation level | R1 | R2 | R3 | R4 | |
|---|---|---|---|---|---|
| 1 | 0 | 0 | 0 | 0 | |
| 2 | 0 | 0 | 0 | 0 | |
| 4 | 3 | 1 | 1 | 0 | sum = 5 |
| 8 | 2 | 1 | 0 | 0 | sum = 3 |
| 16 | 3 | 2 | 1 | 0 | sum = 6 |

(56) References Cited

U.S. PATENT DOCUMENTS

| | | | |
|---|---|---|---|
| 2020/0059328 A1 | 2/2020 | Li et al. | |
| 2020/0314811 A1* | 10/2020 | Lin | H04W 52/0216 |
| 2020/0389874 A1* | 12/2020 | Lin | H04L 5/0096 |
| 2021/0167892 A1* | 6/2021 | Kim | H04L 1/0072 |
| 2021/0297987 A1* | 9/2021 | Hwang | H04W 52/0235 |
| 2021/0320821 A1 | 10/2021 | Lee et al. | |
| 2023/0025637 A1* | 1/2023 | He | H04L 5/0053 |
| 2023/0040333 A1* | 2/2023 | Xu | H04L 25/0238 |
| 2023/0069404 A1* | 3/2023 | Kittichokechai | H04L 5/0096 |

FOREIGN PATENT DOCUMENTS

| | | |
|---|---|---|
| CN | 110012482 A | 7/2019 |
| CN | 110612690 A | 12/2019 |
| CN | 110621073 A | 12/2019 |
| WO | 2013022391 A1 | 2/2013 |
| WO | 2020032750 A1 | 2/2020 |
| WO | 2020032773 A1 | 2/2020 |

OTHER PUBLICATIONS

LG Electronics, "Discussion on search space design", 3GPP TSG RAN WG1 Meeting 90bis, R1-1717952, Prague, CZ [retrieved Oct. 11, 2022]. Retrieved from the Internet <https://www.3gpp.org/ftp/TSG_RAN/WG1_RL1/TSGR1_90b/Docs/>., Oct. 2017, 11 Pages.

PCT/CN2020/079263, "International Preliminary Report on Patentability", PCT Application No. PCT/CN2020/079263, Sep. 22, 2022, 6 pages.

PCT/CN2020/079263, "International Search Report and Written Opinion", PCT Application No. PCT/CN2020/079263, Dec. 14, 2020, 7 pages.

"Foreign Office Action", CN Application No. 202080098466.3, Feb. 11, 2025, 16 pages.

Interdigital, "NB-PDCCH Design for NB-Iot", 3GPP TSG RAN WG1 Meeting #84, R1-160919, St Julian's, Feb. 2016, 3 pages.

* cited by examiner

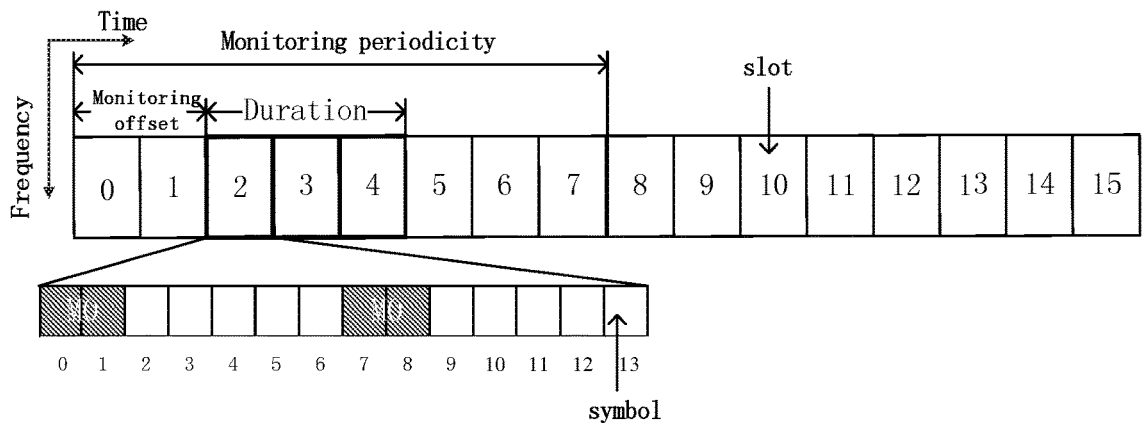

FIG. 3

Table 10.1-1: CCE aggregation levels and maximum number of PDCCH candidates per CCE aggregation level for CSS sets configured by *searchSpaceSIB1*

| CCE Aggregation Level | Number of Candidates |
|---|---|
| 4 | 4 |
| 8 | 2 |
| 16 | 1 |

FIG. 4A

SearchSpace information element

```
SearchSpace ::=            SEQUENCE {
   nrofCandidates              SEQUENCE {
      aggregationLevel1     ENUMERATED {n0, n1, n2, n3, n4, n5, n6, n8},
      aggregationLevel2     ENUMERATED {n0, n1, n2, n3, n4, n5, n6, n8},
      aggregationLevel4     ENUMERATED {n0, n1, n2, n3, n4, n5, n6, n8},
      aggregationLevel8     ENUMERATED {n0, n1, n2, n3, n4, n5, n6, n8},
      aggregationLevel16    ENUMERATED {n0, n1, n2, n3, n4, n5, n6, n8}
   }
}
```

FIG. 4B

| Repetition level<br>CCE aggregation level | R1 | R2 | R3 | R4 | |
|---|---|---|---|---|---|
| 1 | 0 | 0 | 0 | 0 | |
| 2 | 0 | 0 | 0 | 0 | |
| 4 | 3 | 1 | 1 | 0 | sum = 5 |
| 8 | 2 | 1 | 0 | 0 | sum = 3 |
| 16 | 3 | 2 | 1 | 0 | sum = 6 |

| Repetition level / CCE aggregation level | R1 | R2 | R3 | R4 |
|---|---|---|---|---|
| 1 | 0 | 0 | 0 | 0 |
| 2 | 0 | 0 | 0 | 0 |
| 4 | 2 | 2 | 1 | 1 |
| 8 | 1 | 1 | 1 | 1 |
| 16 | 1 | 1 | 1 | 1 | sum = 14

| Repetition level<br>CCE aggregation level | R1 | R2 | R3 | R4 |
|---|---|---|---|---|
| 4 | 1 | 0 | 0 | 0 |
| 8 | 1 | 1 | 0 | 0 |
| 16 | 1 | 1 | 1 | 1 |

METHOD AND APPARATUS FOR PDCCH REPETITION

TECHNICAL FIELD

The present application generally relates to wireless communications, and more particularly, to physical downlink control channel (PDCCH) repetition technology.

BACKGROUND

The next generation wireless communication system 5G is an example of an emerging telecommunication standard. New radio (NR) is generally a set of enhancements to the Long Term Evolution (LTE) mobile standard promulgated by the 3rd Generation Partnership Project (3GPP). 5G and/or NR networks are expected to increase network throughput, coverage, and robustness and reduce latency and operational and capital expenditures.

With the development of 5G and NR networks, various aspects need to be studied and developed to perfect the 5G/NR technology.

SUMMARY

Some embodiments of the present application provide a method for wireless communications performed by a user equipment (UE). The method includes: receiving control channel element (CCE) aggregation level (AL) information in a search space set configuration; determining a scaling factor for each of repetition levels of a maximum repetition number, wherein the maximum repetition number corresponds to a total number of monitor occasions (MOs) within a set of MOs; computing a number of physical downlink control channel (PDCCH) candidates to be monitored for each of the repetition levels based on the CCE AL information and the scaling factor for each of the repetition levels; and receiving a control signal on the PDCCH candidates.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

FIG. 3 illustrates an exemplary search space set in accordance with some embodiments of the present application.

FIG. 4A illustrates an exemplary specification of PDCCH candidate number per AL for CSS sets configured by searchspaceSIB1 in accordance with some embodiments of the present application.

FIG. 4B illustrates a further exemplary specification of PDCCH candidate number per AL for CSS and USS in accordance with some embodiments of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
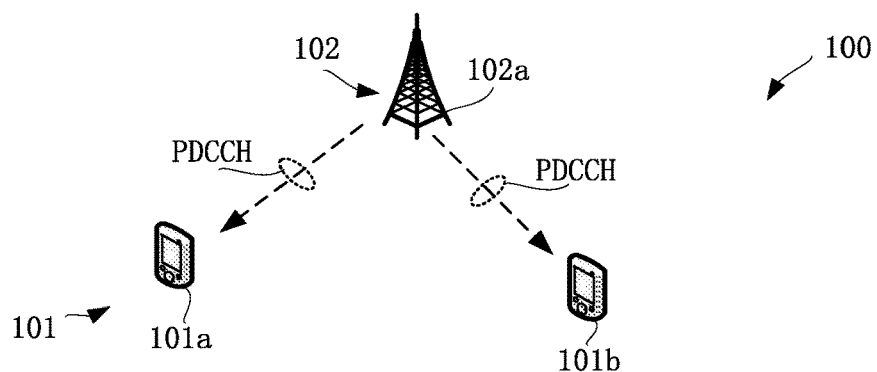
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one user equipment (UE) 101 and at least one base station (BS) 102. In particular, the wireless communication system 100 includes two UEs 101 (e.g., a first UE 101a and a second UE 101b) and one BS 102 (e.g., BS 102a) for illustrative purpose. Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102. BS(s) 102 may communicate directly with each other. For example, BS(s) 102 may communicate directly with each other via Xn interface or X2 interface.

In some embodiments of the present application, the wireless communication system 100 is compatible with the 5G/NR of the 3GPP protocol based on orthogonal frequency division multiplexing (OFDM). The radio resource is partitioned into subframes, each of which may contain one or more time slots. Each slot may be comprised of various number of OFDM symbols, depending on slot configuration. The wireless communication system may also be based on orthogonal frequency division multiple access (OFDMA) downlink.

In 5G/NR network, when there is a downlink packet to be sent from a BS to a UE, each UE gets a downlink assignment, e.g., a set of radio resources in a physical downlink shared channel (PDSCH). When a UE needs to send a packet to a BS in the uplink, the UE gets a grant from the BS that assigns a physical uplink shared channel (PUSCH) consisting of a set of uplink radio resources. The UE gets the downlink and/or uplink scheduling information from a PDCCH that is targeted specifically to that UE. In addition, broadcast control information is also sent in the PDCCH. The downlink and uplink scheduling information and the broadcast control information, carried by the PDCCH, together is referred to as DCI.

As shown in FIG. 1, PDCCHs are used for a BS 102 to send DCI to the first UE 101a and the second UE 101b. A PDCCH may be transmitted in a control resource set (CORESET). The CORESET is a set of contiguous or distributed physical resource blocks (PRBs) configures for PDCCH transmission. Resource elements corresponding to the same OFDM symbol may be grouped into resource element groups (REGs). A CORESET may include one or multiple control channel elements (CCEs). Each CCE may include multiple REGs in one or more symbols.

A PDCCH search space is a set of candidate control channels formed by CCEs at a given aggregation level, which a device is supposed to attempt to decode. A PDCCH search space may also be termed as a search space. A search space set is a set of search spaces, each of which corresponds to an aggregation level. A DCI being transmitted using an aggregation level k means that k CCEs are aggregated for the transmission. A search space set is associated with a CORESET and is configured through radio resource control (RRC) signaling.

A UE may perform blind decoding throughout a PDCCH search space trying to find PDCCH data (e.g., DCI). In a PDCCH region in a downlink (DL) radio frame, there can be many places where a specific PDCCH is located and a UE searches all the possible locations for PDCCH. All possible locations for PDCCH are called a search space, and each possible location is called a PDCCH candidate.

There are two types of search space: the common search space (CSS) and the UE-specific search space (USS). A UE is required to monitor both common and UE-specific search space.

Currently, a 3GPP standard work group has approved for supporting a reduced capability NR device. One objective of the 3GPP standard work group is studying functionality that will enable a performance degradation of complexity reduction of a NR device to be mitigated or limited. A possible solution is to compensate a performance loss of reduced number of UE transmitting antennas, UE receiving antennas, and UE Bandwidth reduction. Wherein, for solving the problem concerning PDCCH coverage loss, an effective mechanism is PDCCH repetition.

A maximum domain of a search space is determined by a max repetition number $R_{max}$. The max repetition number $R_{max}$ may be configured by RRC signaling. A UE only detects a $R_{max}$ in one PDCCH period. The total number of $R_i$ is determined by $R_{max}$ and $R_i$ (except CSS for paging), wherein $R_i$ means a repetition level. Particular examples are shown in FIGS. 2A and 2B.

Figure 2A:
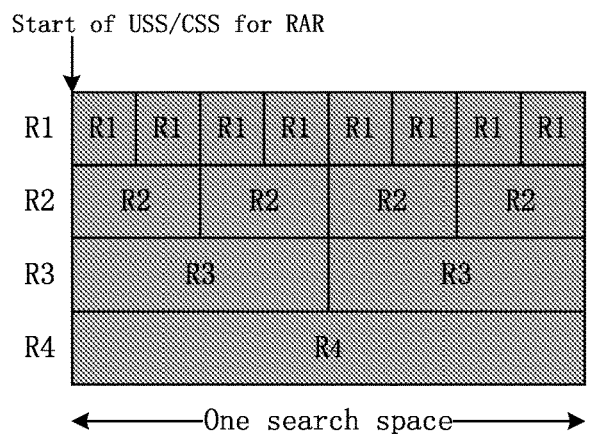
FIG. 2A illustrates an exemplary configuration of a search space in accordance with some embodiments of the present application.

FIG. 2A illustrates an exemplary configuration of a search space in accordance with some embodiments of the present application.

The embodiments of FIG. 2A refer to a scenario of USS/CSS for random access response (RAR). In the embodiments of FIG. 2A, a repetition level $R_i$ in one search space is R1, R2, R3, and R4, respectively. As can be seen, corresponding to the same value of $R_{max}$, a maximum total number of R1 is 8, a maximum total number of R2 is 4, a maximum total number of R3 is 2, and a maximum total number of R4 is 1. The first $R_i$ starts from a start of USS/CSS for RAR. In the scenario of USS/CSS for RAR, a UE will monitor all number of $R_i$ in the search space.

Figure 2B:
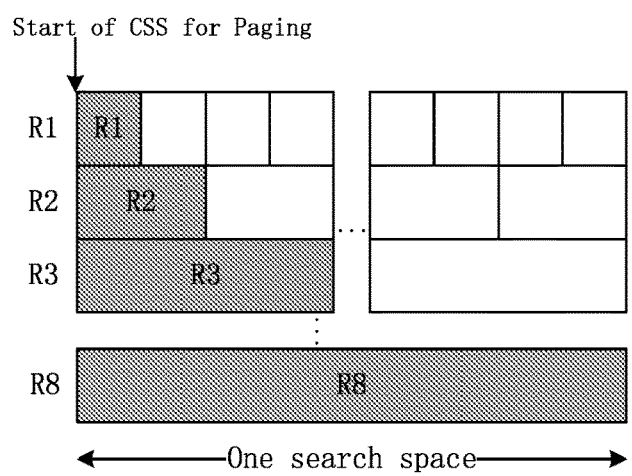
FIG. 2B illustrates a further exemplary configuration of a search space in accordance with some embodiments of the present application.

FIG. 2B illustrates a further exemplary configuration of a search space in accordance with some embodiments of the present application.

The embodiments of FIG. 2B refer to a scenario of CSS for paging. In the embodiments of FIG. 2B, a repetition level $R_i$ in one search space is R1, R2, R3, R4, R5, R6, R7, and R8, respectively (R4 to R7 are not shown). In the scenario of CSS for paging, a UE will only monitor a $R_i$ in the search space, as shown in FIG. 2B. The $R_i$ starts from the start of CSS for a paging procedure.

A PDCCH search space may be determined by search space configuration and CORESET configuration. The search space configuration may contain parameters of periodicity, duration, and monitoring occasion (MO) start symbols within a slot, as specified in 3GPP standard document TS38.213. The first symbol(s) for PDCCH monitoring in the slots configured for PDCCH monitoring is in the parameter 'monitoringSymbolsWithinSlot'. The CORESET configuration may contain parameters of MO duration, which may be 1 symbol, 2 symbols, or 3 symbols.

One exemplary search space set configuration is listed in Table 1. Meanings of each parameter in Table 1 are shown below.

TABLE 1

Parameter values for search space set configuration
An exemplary search space set configuration

| MonitoringSlotPeriodicity | 8 slots |
| Offset | 2 slots |
| Duration of search space set | 3 slots |
| monitoringSymbolsWithinSlot | 10000001000000 |

MonitoringSlotPeriodicity: slot(s) for PDCCH monitoring which is configured as periodicity;
Offset: slot(s) for PDCCH monitoring configured which is as an offset;
Duration of search space set: the number of consecutive slots that a search space lasts in every occasion; and
monitoringSymbolsWithinSlot: the first symbol(s) for PDCCH monitoring in the slots which are configured for PDCCH monitoring.

As specified in sector 10.1 of 3GPP standard document TS38.213, a UE does not expect any two PDCCH MOs on an active DL bandwidth part (BWP), for the same or different search space sets, in the same CORESET to be separated by a non-zero number of symbols smaller than the CORESET duration. That is, when a MO duration is configured as 1 symbol, corresponding continuous bits are '1'. When a MO duration is configured as 2 symbols, corresponding continuous bits are '10' and continuous bits '11' are not used. When a MO duration is configured as 3 symbols, corresponding continuous bits are '100', and continuous bits '111'/'110'/'101' are not used. A particular example is given in FIG. 3.

FIG. 3 illustrates an exemplary search space set in accordance with some embodiments of the present application. The parameter values corresponding to the embodiments of FIG. 3 are given in Table 1.

In the embodiments of FIG. 3, a PDCCH monitoring periodicity is 8 slots, a PDCCH monitoring offset is 2 slots (i.e., slots 0 and 1), and a duration of a search space set is 3 slots (i.e., slots 2 to 4). Each slot in the duration of the search space set includes 14 symbols. From 'monitoringSymbolsWithinSlot' in Table 1, it can be seen that symbol 0 and 7 are the first symbol for PDCCH monitoring. If the CORESET duration is set to 2, symbols 0 and 1, and symbols 7 and 8 are separately two PDCCH MOs in a slot as shown in FIG. 3.

FIG. 4A illustrates an exemplary specification of PDCCH candidate number per AL for CSS sets configured by searchspaceSIB1 in accordance with some embodiments of the present application.

FIG. 4A shows Table 10.1-1 of 3GPP standard document TS38.213, which specifies CCE aggregation levels (ALs) and the maximum number of PDCCH candidates per CCE AL for CSS sets configured by searchSpaceSIB1. As shown in FIG. 4A, for CSS, there are three CCE ALs, i.e., 4, 8 and 16, and the corresponding maximum numbers of PDCCH candidates are 4, 2, and 1, respectively.

FIG. 4B illustrates a further exemplary specification of PDCCH candidate number per AL for CSS and USS in accordance with some embodiments of the present application.

FIG. 4B shows 'SearchSpace information element' defined in 3GPP standard document TS38.331, which specifies CCE ALs and a sequence of maximum number of PDCCH candidates per CCE AL for USS sets. As shown in FIG. 4B, for USS, a CCE AL may be one of {1, 2, 4, 8, 16} and may be configured by RRC signaling through the field nrofCandidates in IE SearchSpace.

3GPP standard document TS38.331 also specifies that the IE SearchSpace defines how/where to search for PDCCH candidates; for a scheduled cell in the case of cross carrier scheduling, except for nrofCandidates, all the optional fields are absent. 3GPP standard document TS38.213 specifies that nrofCandidates represents number of PDCCH candidates per AL.

As shown in FIG. 4B, the sequence of the maximum number of PDCCH candidates per CCE AL includes one of {n0, n1, n2, n3, n4, n5, n6, n8}, which represents that a UE needs to blindly detect maximum 8 PDCCH candidates for a CCE AL. If PDCCH repetition is enabled, the UE also needs to blindly detect different repetition level. Thus, UE's blind detection complexity will be relatively high. Moreover, a candidate number for each PDCCH repetition level needs to be configured. A particular example is shown in FIG. 5.

Figure 5:
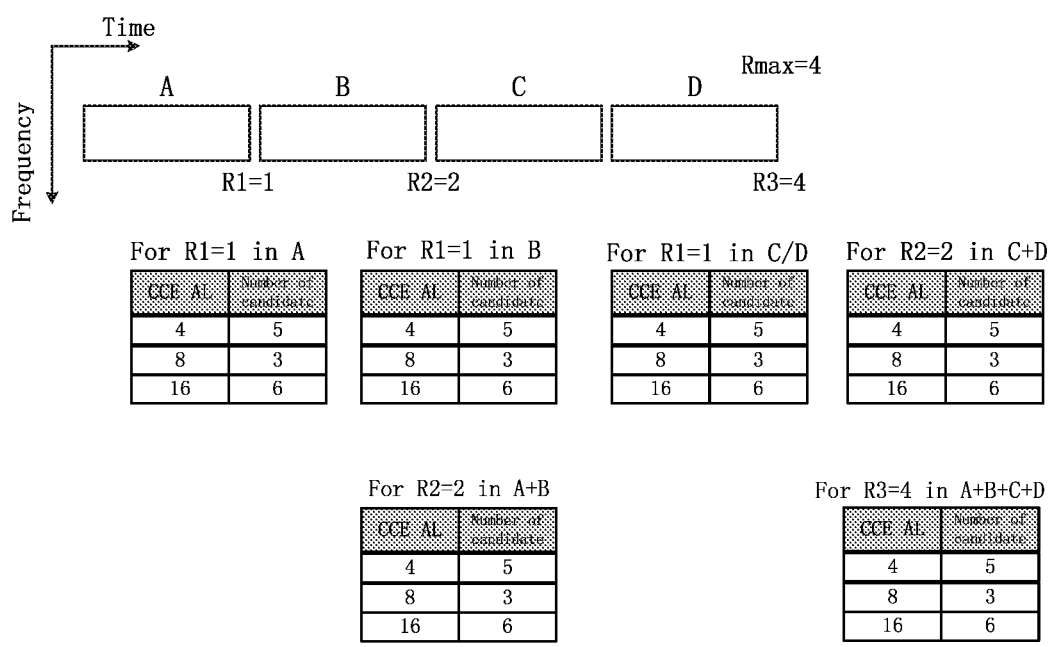
FIG. 5 illustrates an exemplary configuration for a total number of PDCCH candidates in accordance with some embodiments of the present application.

FIG. 5 illustrates an exemplary configuration for a total number of PDCCH candidates in accordance with some embodiments of the present application. In the embodiments of FIG. 5, a PDCCH search space for $R_i$ is based on the embodiments of FIG. 2A.

As shown in FIG. 5, a PDCCH search space includes four MOs in time and frequency domains, which are marked as A, B, C, and D. The embodiments of FIG. 5 suppose $R_{max}$=4, and accordingly, values for $R_i$ are R1=1, R2=2, and R3=4, respectively. The embodiments of FIG. 5 further suppose the configured PDCCH candidates are 0, 0, 5, 3, and 6 for AL of {1, 2, 4, 8, and 16}, respectively. Six tables in FIG. 5 refer to computing results of a total number of PDCCH candidates when enabling a PDCCH repetition.

In particular, for each single MO, a total number of PDCCH candidates is 5+3+6=14 as shown in FIG. 5. That is, in a scenario of disabling a PDCCH repetition, there are 14 PDCCH candidates in each signal MO. In this scenario, a number sum of signal MOs, i.e., MO A, B, C, and D, is 4. Accordingly, a total number of PDCCH candidates at end of MO D is 14*4=56. Thus, according to a search space set configuration in FIG. 5, a UE needs to blindly detect up to 56 PDCCH candidates in the PDCCH search space in a scenario of disabling a PDCCH repetition.

In a scenario of enabling a PDCCH repetition, there are 14 PDCCH candidates for each repetition level. In this scenario, a number sum of signal MO A, signal MO B, and a combination MO of A+B is 3, and 14*3=42. That is, a total number of PDCCH candidates is 42 at end of MO B. Similarly, a number sum of signal MOs A, B, C, and D is 4, and a number sum of combination MOs of A+B, C+D, and A+B+C+D is 3. That is, a total number of PDCCH candidates is at end of MO D is 14*(4+3)=98. Thus, according to a search space set configuration in FIG. 5, a UE needs to blindly detect up to 98 PDCCH candidates in the PDCCH search space in a scenario of enabling a PDCCH repetition.

As can be seen, the scenario of enabling a PDCCH repetition requires larger number of PDCCH candidates, compared with the scenario of disabling a PDCCH repetition. Larger number of PDCCH candidates will consume more power of a UE.

In addition, a MO may be used in a search space set to transmit repetitions of a PDCCH. The search space set is determined by a search space set duration and the parameter 'monitoringSymbolsWithinSlot'. A total number of MO(s) in the search space set may be larger than configured $R_{max}$ or not power of 2. This case will cause some problems of blind detection to a UE, for example, how to determine a start position of a search space, how to determine a total number of search spaces in a search space set, how to handle the remaining MOs whose number is smaller than $R_{max}$ and thus cannot constitute a complete search space, and/or how to reduce blind detection complexity of a UE. The number of PDCCH candidates is configured by a high layer or RRC signaling, not fixed in a table or a standard. So it is better to define a rule for the PDCCH candidate when a PDCCH repetition is enabled. Embodiments of the present application focus on providing several alternatives to solve the above problems.

Figure 6:
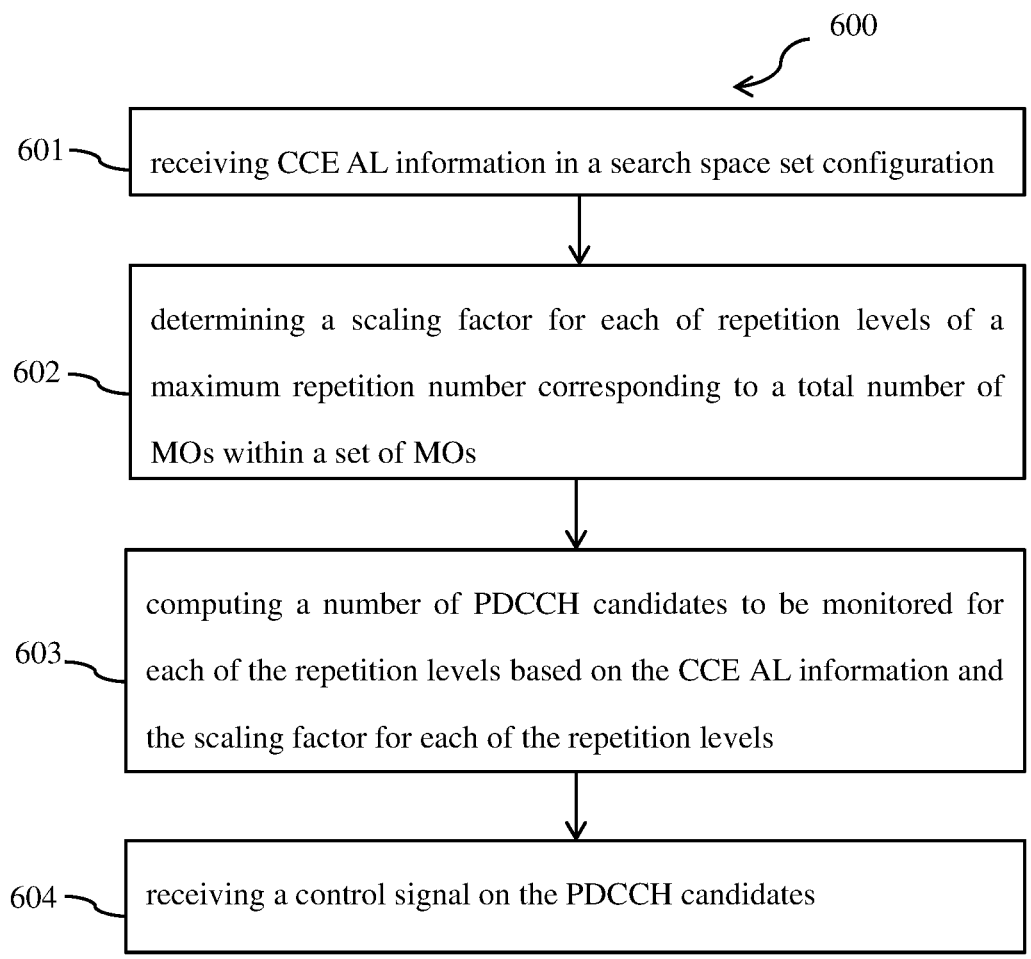
FIG. 6 illustrates a flow chart of a method for wireless communications in accordance with some embodiments of the present application.

FIG. 6 illustrates a flow chart of a method for wireless communications in accordance with some embodiments of the present application. The exemplary method 600 shown in FIG. 6 is performed by a UE to receive PDCCH repetition from a BS.

In the exemplary method 600, in operation 601, a UE (e.g., the first UE 101a as illustrated and shown in FIG. 1) receives CCE AL information in a search space set configuration. In operation 602, the UE determines a scaling factor for each of repetition levels of a maximum repetition number corresponding to a total number of MOs within a set of MOs. A maximum repetition number may be named as $R_{max}$. A set of MOs refers to a search space in a search space set.

According to some embodiments of the present application, the maximum repetition number, i.e., $R_{max}$, may be configured by RRC signaling. $R_{max}$ may be defined to include one or more MOs, and the MOs are deduced from a parameter 'monitoringSymbolsWithinSlot'.

In operation 603, the UE computes a number of PDCCH candidates to be monitored for each repetition level based on the CCE AL information and the scaling factor for each repetition level. In operation 604, the UE receives a control signal on the number of PDCCH candidates.

Details described in all other embodiments of the present application are applicable for the embodiments of FIG. 6. Moreover, details described in the embodiments of FIG. 6 are applicable for all the embodiments of FIGS. 7-16. The details can be, for example, details on how to determine a start position of a search space, how to determine a total number of search spaces in a search space set, how to handle the remaining MOs that cannot constitute a complete search space, and/or how to reduce blind detection complexity of a UE.

Figure 7:
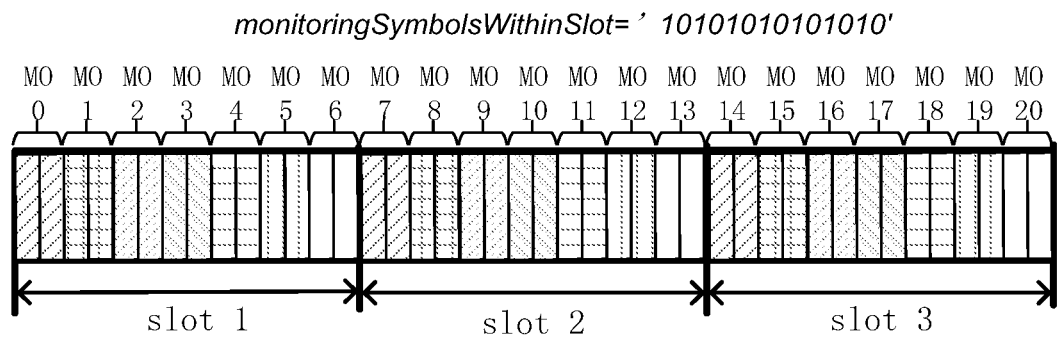
FIG. 7 illustrates an exemplary search space set configuration in accordance with some embodiments of the present application.

FIG. 7 illustrates an exemplary search space set configuration in accordance with some embodiments of the present application.

The embodiments of FIG. 7 show a search space set based on a search space set configuration. Search space set duration of the search space set is 3 slots (i.e., slot 1, slot 2, and slot 3 as shown in FIG. 7). For each slot, a parameter 'monitoringSymbolsWithinSlot' is '10101010101010'. A duration of each MO is 2 symbols, and there are totally 21 MOs in the search space set (i.e., MO 0 to MO 20 as shown in FIG. 7).

Figure 8:
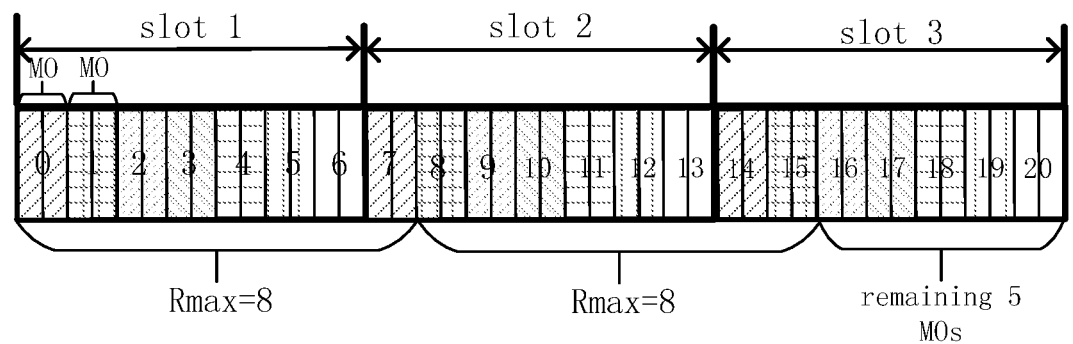
FIG. 8 illustrates an exemplary configuration for a start position of a search space in accordance with some embodiments of the present application.

FIG. 8 illustrates an exemplary configuration for a start position of a search space in accordance with some embodiments of the present application. A search apace set configuration for the embodiments of FIG. 8 is consistent with that of the embodiments of FIG. 7 as described above.

The embodiments of FIG. 8 suppose that a maximum repetition number, i.e., $R_{max}$, for a search space is configured as 8. As shown in FIG. 8, totally 21 MOs in the search space set include two search spaces corresponding to $R_{max}$ and remaining 5 MOs. Since the number of these remaining MOs (i.e., 5) is smaller than the value of $R_{max}$ (i.e., 8), they cannot constitute a complete search space. Each of these two search spaces includes 8 MOs. A start position of the first search space is the MO indexed 0. A start position of the second search space is the MO indexed 7, which is derived from the MO indexed 0 and the value of $R_{max}$.

If a UE only blindly detects the two search spaces as shown in FIG. 8, while a BS needs to transmit PDCCH in one of the remaining MO(s) (e.g., the MO indexed 16), the UE will miss the PDCCH in remaining MO(s) in this search space set. Some embodiments of the present application can solve this problem.

When DCI is set to be repeated, a CORESET can only be set to 2 symbols or 3 symbols. According to some embodiments of the present application, a start position of a search space may be derived from bitmaps other than '10' or '100' for 2 or 3 CORESET symbols, and the bitmaps may implicitly indicate a maximum repetition number, i.e., $R_{max}$.

According to some embodiments of the present application, a CORESET is set to 2 symbols, and bitmaps are as follows.

bitmap '10' of the 2 symbols represents a position of a MO of the search space set; and bitmap '11' of the 2 symbols represents a start position of a search space and represents that the maximum repetition number is 2.

Figure 9A:
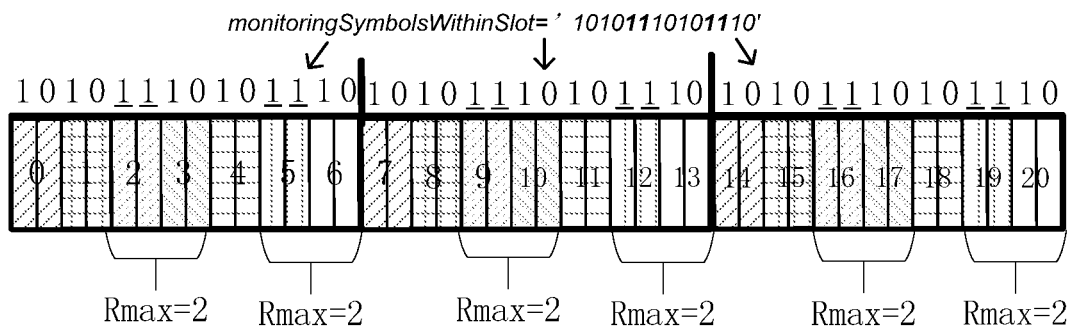
FIGS. 9A-9C illustrate exemplary configurations for a start position of a search space in accordance with some embodiments of the present application.
Figure 9B:
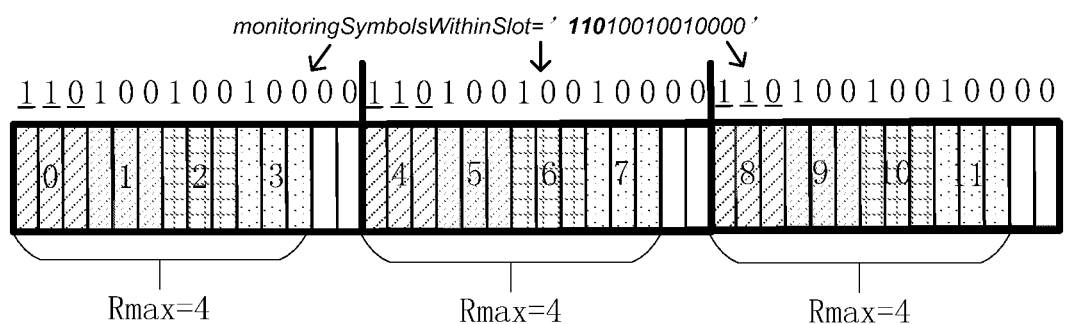
Figure 9C:
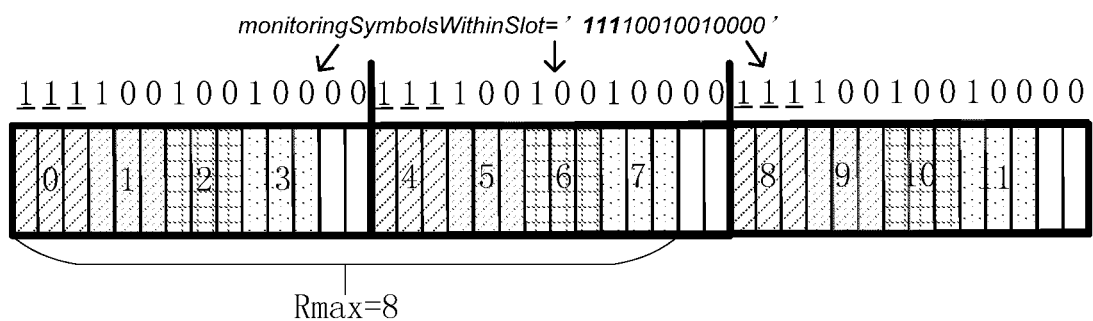

According to some embodiments of the present application, a CORESET is set to 3 symbols, and bitmaps are as follows. Particular examples are shown in FIGS. 9A-9C.

bitmap '100' of the 3 symbols represents a position of a MO of the search space set;

bitmap '101' of the 3 symbols represents a start position of a search space and represents that the maximum repetition number is 2;

bitmap '110' of the 3 symbols represents a start position of a search space and represents that the maximum repetition number is 4; and bitmap '111' of the 3 symbols represents a start position of a search space and represents that the maximum repetition number is 8.

FIGS. 9A-9C illustrate exemplary configurations for a start position of a search space in accordance with some embodiments of the present application.

FIG. 9A refers to an example of different start positions of search spaces and repetition number determination. The search apace set configuration for the embodiments of FIG. 9A is similar to that of the embodiments of FIGS. 7 and 8. Two bold continuous bits "11" in the parameter 'monitoringSymbolsWithinSlot' in FIG. 9A indicate that the maximum repetition number is 2, i.e., $R_{max}=2$, and a start position of each search space in each slot (i.e., one of slots, 1, 2, and 3 implicated shown in FIG. 9A) corresponding to the configured $R_{max}=2$.

FIG. 9B refers to an example of different start positions of search spaces and repetition number determination. The search space set configuration for the embodiments of FIG. 9B is that, search space set duration of the search space is 3 slots and the duration of each MO is 3 symbols. There are totally 12 MOs, indexed from 0 to 11, in the search space set. Three bold continuous bits "110" in the parameter 'monitoringSymbolsWithinSlot' in FIG. 9B indicate that the maximum repetition number is 2, i.e., $R_{max}=4$, and a start position of each search space in each slot (i.e., one of slots, 1, 2, and 3 implicated shown in FIG. 9B) corresponding to the configured $R_{max}=4$.

The search apace set configuration for the embodiments of FIG. 9C is similar to that of the embodiments of FIG. 9B, except for that $R_{max}$ for a search space is configured as 8. Three bold continuous bits '111' in the parameter 'monitoringSymbolsWithinSlot' in the first slot in FIG. 9C indicate the maximum repetition number and a start position of $R_{max}$. Three bold continuous bits '111' in the parameter 'monitoringSymbolsWithinSlot' in the second slot in FIG. 9C is overlapped with a previous repetition, so it doesn't indicate the maximum repetition number or a start position of a search space, but only indicates a position of a MO. The number of MO starting from the MO indicated by three continuous bits '111' in the third slot in FIG. 9C is less than $R_{max}$. It also doesn't indicate the maximum repetition number or a start position of a search space, but only indicates a position of a MO.

According to some embodiments of the present application, a start position of a search space is derived from a start position of search space duration, $R_{max}$, an offset, and a MO start position. The offset may be configured by RRC signaling.

Figure 10:
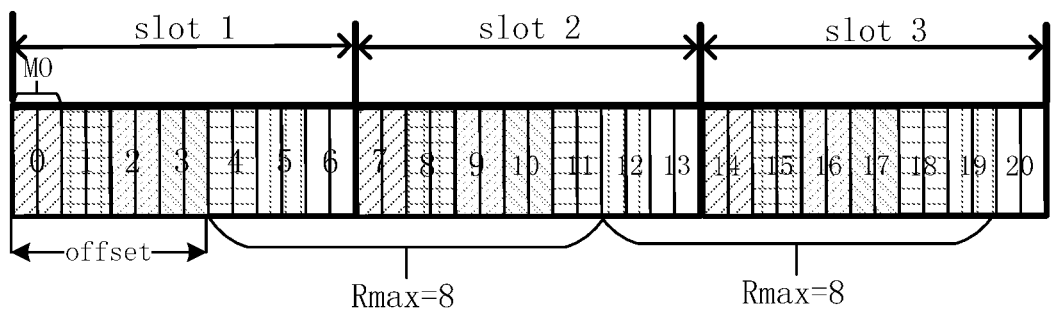
FIG. 10 illustrates a further example of a start position of a search space in accordance with some embodiments of the present application.

FIG. 10 illustrates a further example of a start position of a search space in accordance with some embodiments of the present application. In the embodiments of FIG. 10, each MO includes two symbols, and an offset is configured as 4 MOs, $R_{max}=8$. Thus, it can be derived that a start position of the first search space is the MO indexed 4. A start position of the second search space is the MO indexed 12, which is derived from the MO indexed 0, the value of $R_{max}$ and the offset.

According to some embodiments of the present application, a total number of search spaces in a search space set is determined by a search space duration, a bitmap of 'monitoringSymbolsWithinSlot', the offset and a value of $R_{max}$. The embodiments of the present application suppose that N is a total number of MO indicated by the parameter 'monitoringSymbolsWithinSlot'.

In an embodiment of the present application, a total number of search spaces in a search space set is determined by equation (1) when the offset is configured as 0 or is not configured:

$$\text{floor}(duration*N/R_{max}) \qquad (1)$$

wherein duration represents a duration of a search space set, and N represents a total number of MO indicated by the parameter 'monitoringSymbolsWithinSlot'.

In a further embodiment of the present application, a total number of search spaces in a search space set is fixed to 1. In an additional embodiment of the present application, a total number of search spaces in a search space set is configured by a high layer or RRC signaling.

Some embodiments of the present application refer to computing a total number of $R_i$ in a search space set corresponding to a search space set configuration. In particular:

When $R_{max}=1$, $R_i$ value for configured $R_{max}$ may be determined as: $R_1=1$;

When $R_{max}=2$, $R_i$ value for configured $R_{max}$ may be determined as: $R_2=2$, and $R_1=1$;

When $R_{max}=4$, $R_i$ value for configured $R_{max}$ may be determined as: $R_3=4$, $R_2=2$, and $R_1=1$; and When $R_{max} \geq 8$, $R_i$ value for configured $R_{max}$ may be determined as: $R_4=R_{max}$, $R_3=R_{max}/2$, $R_2=R_{max}/4$, and $$R_1 = \frac{R_{max}}{8}.$$

According to some embodiments of the present application, a total number of $R_i$ in a search space set is determined by the value of $R_{max}$, a total number of search spaces in a search space set and $R_i$. For example, PDCCH candidates for $R_i$ may be determined by equation (2):

$$M*R_{max}/R_i \qquad (2)$$

wherein M represents a total number of search spaces in a search space set.

According to some embodiments of the present application, a total number of PDCCH candidates for $R_i$ is determined by equation (3) when the offset is configured as 0 or is not configured:

$$\text{floor}(duration*N/R_i) \qquad (3)$$

wherein "duration" represents a duration of a search space set, and N represents a total number of MO indicated by the parameter 'monitoringSymbolsWithinSlot'.

FIGS. 11A-11D illustrate additional examples of a total number of each of the repetition levels in accordance with some embodiments of the present application.

Figure 11A:
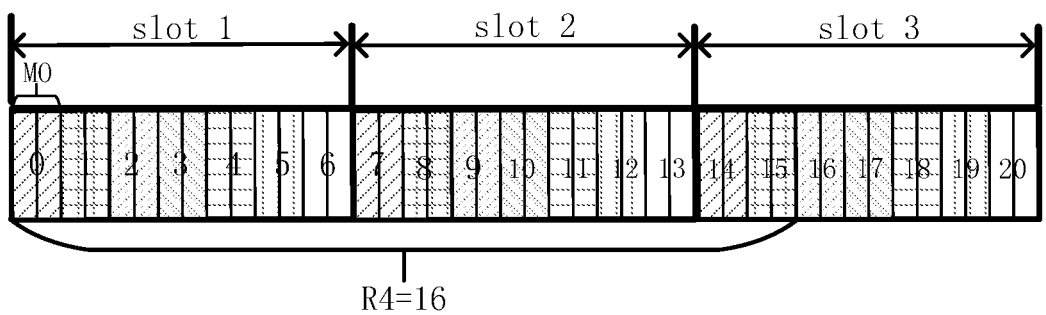
FIGS. 11A-11D illustrate examples of a total number of each of the repetition levels in accordance with some embodiments of the present application.
Figure 11B:
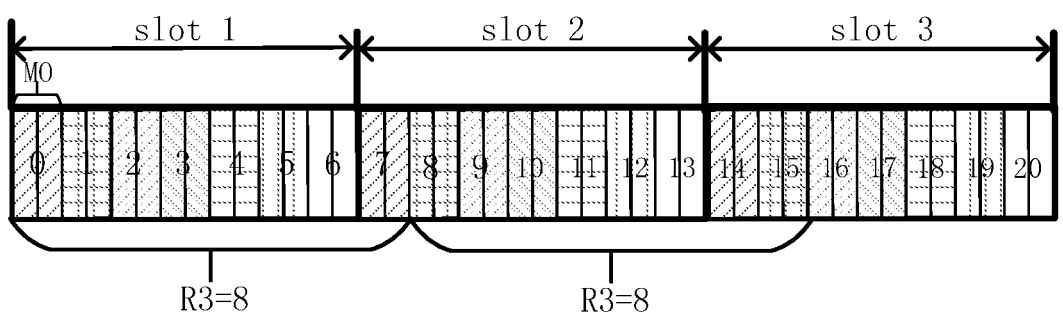
Figure 11C:
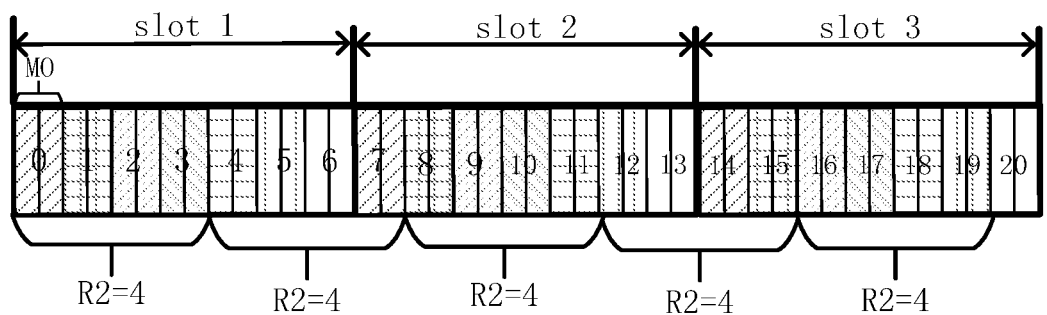
Figure 11D:
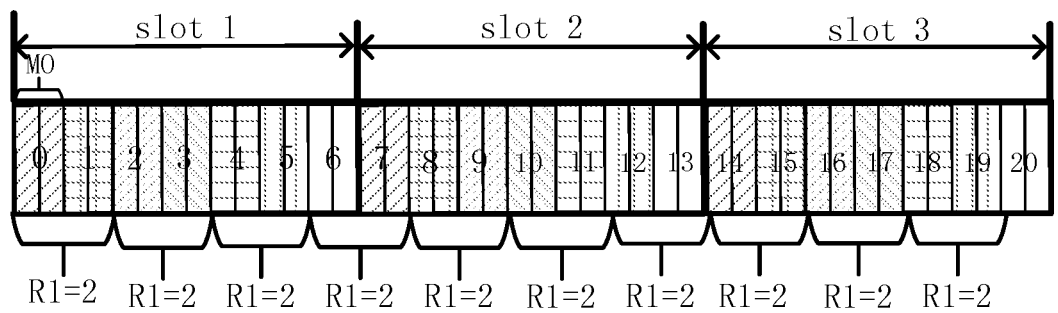

In the embodiments of FIGS. 11A-11D, duration*N=21, $R_{max}=16$ and the offset is 0. It can be computed according to equation (3) that: $R_4=16$ as shown in FIG. 11A, $R_3=8$ as shown in FIG. 11B, $R_2=4$ as shown in FIG. 11C, and $R_1=2$ as shown in FIG. 11D. The PDCCH candidate for $R_4$ is 1 as shown in FIG. 11A. The PDCCH candidates for $R_3$ is 2 as shown in FIG. 11B. The PDCCH candidates for $R_2$ is 5 as shown in FIG. 11C. The PDCCH candidates for $R_1$ is 10 as shown in FIG. 11D.

When $R_{max}=1$, monitoring PDCCH candidates by a UE may be in the same detection complexity as the legacy solution in the art. However, embodiments of the present application can efficiently reduce blind detection complexity of a UE, especially when $R_{max}>1$.

Specifically, when $R_{max}>1$, if the PDCCH candidate number for a CCE AL is configured as 0, the PDCCH candidate number for the CCE AL at R1 is 0, the PDCCH candidate number for the CCE AL at R2 is 0, the PDCCH candidate number for this CCE AL at R3 is 0, and the PDCCH candidate number for the CCE AL at R4 is 0.

According to some embodiments of the present application, a total number of PDCCH candidates for $R_i$ at a CCE AL may be determined by:
  a PDCCH candidate number at the CCE AL configured by a high layer or RRC signaling; and
  a scaling factor $\alpha$.

In an embodiment, the scaling factor is predefined. In another embodiment, the scaling factor is not predefined, but is configured by high layer or RRC signaling.

In one embodiment, the scaling factor may be predefined as $$\frac{1}{2}, \frac{1}{4}, \frac{1}{8}, \frac{1}{16}$$

for R1, R2, R3, and R4, respectively. A total number of PDCCH candidates for $R_i$ may be determined by equation (4) below. A method of computing a total number of PDCCH candidates for $R_i$ according to equation (4) may be named as Method 1.

$$\text{floor}(\alpha * X + 0.5) \tag{4}$$

wherein $\alpha$ represents a scaling factor which is one of the four predefined values, and X represents the PDCCH candidate number at a CCE AL configured by high layer.

$$\frac{1}{4}, \frac{1}{4}, \frac{1}{4}, \frac{1}{4}$$

In a further embodiment, the scaling factor may be predefined as for R1, R2, R3, and R4, respectively. The total number of PDCCH candidates for $R_i$ may be determined by equation (5) or equation (6) below. A method of computing a total number of PDCCH candidates for $R_i$ according to equation (5) or equation (6) may be named as Method 2.

$$\text{floor}(\alpha * X) + 1, \text{ if } i <= (X \% 4) \tag{5}$$

$$\text{floor}(\alpha * X), \text{ if } i > (X \% 4) \tag{6}$$

wherein i represents a subscript of $R_i$;
$\alpha$ represents a scaling factor which is one of the four predefined values; and
X represents the candidate number at a CCE AL configured by a high layer or RRC signaling.

According to some embodiments of the present application, a total number of PDCCH candidates for $R_i$ at a CCE AL is determined by:
  a sum of PDCCH candidate number for every CCE AL configured by a high layer or RRC signaling; and
  a scaling factor $\alpha$.

More specifically, for CCE AL(s) corresponding to a non-zero PDCCH candidate number, the scaling factor $\alpha$ may be determined by:
  a total number of CCE AL(s) which correspond to a non-zero PDCCH candidate number; and
  a maximum total number of the repetition levels.

For CCE AL(s) corresponding to a zero PDCCH candidate number, the scaling factor $\alpha$ is 0.

There are multiple cases corresponding to different CCE AL(s) whose configured PDCCH candidate number is non-zero and in different repetition level(s). The cases are numbered from 0 in an order of first-AL-second-$R_i$ or in an order of first-$R_i$-second-AL. An order number for each case may be named as S. The number of PDCCH candidates may be determined by equation (7) or equation (8) as below.

$$\text{floor}(\alpha * Y) + 1, \text{ if } S <= (Y - W * Z) \tag{7}$$

$$\text{floor}(\alpha * Y), \text{ if } S > (Y - W * Z) \tag{8}$$

wherein S represents an order number for a case corresponding to a CCE AL whose configured PDCCH candidate number is not 0 and a repetition level;
$\alpha$ represents a scaling factor;
Y represents a sum of PDCCH candidate number for every CCE AL configured by a high layer or RRC signaling;
W represents a maximum total number of the repetition level; and
Z represents a total number of AL corresponding to a non-zero candidate number.

A method of computing a total number of PDCCH candidates for $R_i$ according to equation (7) or equation (8) may be named as Method 3. In Method 3, the scaling factor $\alpha$ in equation (7) and equation (8) is $$\frac{1}{W*Z}$$

for AL corresponding to a non-zero PDCCH candidate number, and is 0 for AL corresponding to a zero PDCCH candidate number.

Figures 16, 17:
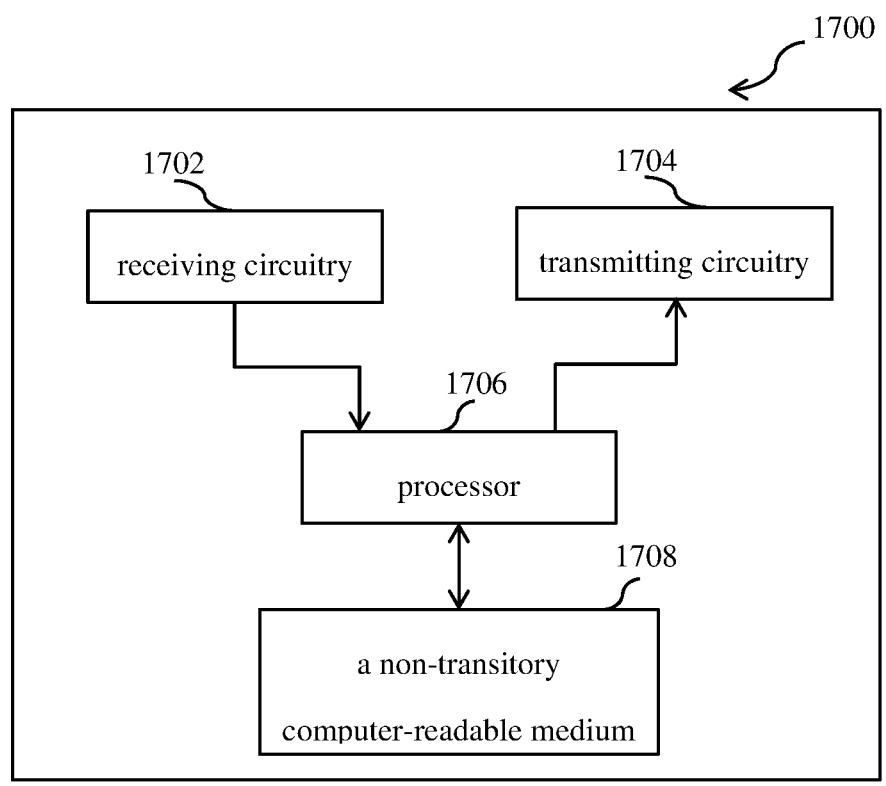
FIG. 16 illustrates an additional exemplary configuration of PDCCH candidate number in accordance with some embodiments of the present application.
FIG. 17 illustrates a block diagram of an exemplary apparatus in accordance with some embodiments of the present application.

In an additional embodiment, a number of PDCCH candidates for $R_i$ at a CCE AL are determined by FIG. 16. This method may be named as Method 4.

Figures 12, 13:
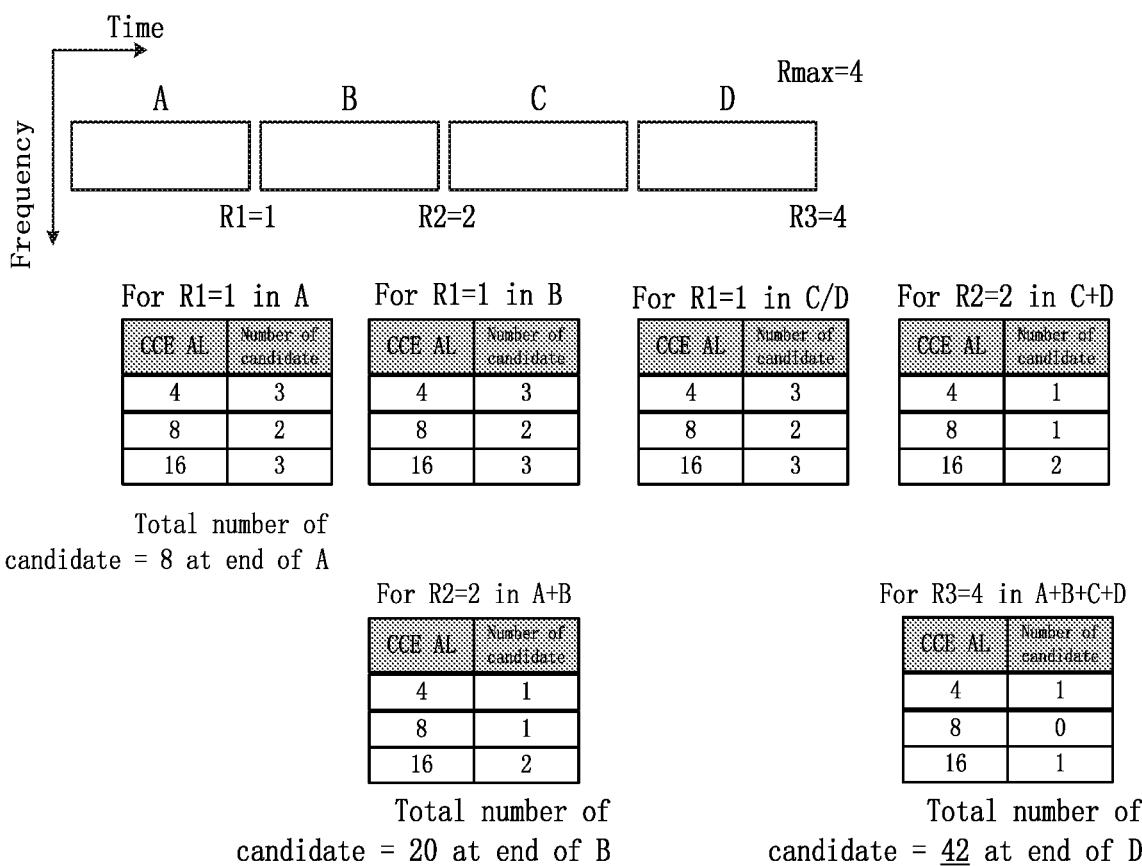
FIG. 12 illustrates an exemplary configuration of PDCCH candidate number in accordance with some embodiments of the present application.
FIG. 13 illustrates a further exemplary configuration for a total number of PDCCH candidates in accordance with some embodiments of the present application.

FIG. 12 illustrates an exemplary configuration of PDCCH candidate number in accordance with some embodiments of the present application. The embodiments of FIG. 12 use Method 1.

The embodiments of FIG. 12 suppose that PDCCH candidates for CCE AL {1, 2, 4, 8, 16} is configured as 0, 0, 5, 3, 6 in accordance with FIG. 4B. That is, PDCCH candidates for CCE AL 1 is configured as n0, PDCCH candidates for CCE AL 2 is configured as n0, PDCCH candidates for CCE AL 4 is configured as n5, PDCCH candidates for CCE AL 8 is configured as n3, and PDCCH candidates for CCE AL 16 is configured as n6.

The embodiments of FIG. 12 suppose that repetition levels $R_i$ include R1, R2, R3, and R4, as shown in FIG. 12. The embodiments of FIG. 12 suppose using the predefined scaling factors $$\frac{1}{2}, \frac{1}{4}, \frac{1}{8}, \frac{1}{16}$$

for each repetition level (i.e., R1, R2, R3, and R4), respectively, according to Method 1.

In particular, since the number of PDCCH candidates for CCE AL 1 is configured as 0, i.e., n0, the parameter X in equation (4) for CCE AL 1 equals to 0. PDCCH candidates for CCE AL 2 is also configured as 0, i.e., n0, and the parameter X in equation (4) for CCE AL 2 equals to 0. Thus, according to equation (4), for both CCE ALs 1 and 2, a total number of PDCCH candidates for each of R1, R2, R3, and R4 is 0, as shown in a solid line box of FIG. 12.

Similarly, since the number of PDCCH candidates for CCE AL 4 is configured as 5, i.e., n5, the parameter X in equation (4) for CCE AL 1 equals to 5. R1 R2, R3, and R4 correspond to the predefined scaling factors $$\frac{1}{2}, \frac{1}{4}, \frac{1}{8}, \frac{1}{16}$$

respectively. Thus, according to equation (4), for CCE AL 4, a total number of PDCCH candidates for R1 and the predefined scaling factor $$\frac{1}{2} \text{ is } \left(\frac{1}{2} * 5 + 0.5\right) = 3.$$

According to equation (4), for CCE AL 4, a total number of PDCCH candidates for R2 and the predefined scaling factor $$\frac{1}{4} \text{ is } \left(\frac{1}{4} * 5 + 0.5\right) = 1;$$

a total number of PDCCH candidates for R3 and the predefined scaling factor $$\frac{1}{8} \text{ is } \left(\frac{1}{8} * 5 + 0.5\right) = 1;$$

and a total number of PDCCH candidates for R4 and the predefined scaling factor $$\frac{1}{16} \text{ is } \left(\frac{1}{16} * 5 + 0.5\right) = 0.$$

These results are shown in the first dotted line box of FIG. 12, and their sum is 5, which equals to n5 configured for CCE AL 4.

Likewise, according to equation (4), for CCE AL 8, a total number of PDCCH candidates for R1, R2, R3, and R4 and the predefined scaling factors $$\frac{1}{2}, \frac{1}{4}, \frac{1}{8}, \frac{1}{16}$$

are 2, 1, 0, and 0, respectively. A sum of these is 3, as shown in the second dotted line box of FIG. 12, which equals to n3 configured for CCE AL 8.

According to equation (4), for CCE AL 16, a total number of PDCCH candidates for R1, R2, R3, and R4 and the predefined scaling factors $$\frac{1}{2}, \frac{1}{4}, \frac{1}{8}, \frac{1}{16}$$

are 3, 2, 1, and 0, respectively. A sum of these is 6, as shown in the third dotted line box of FIG. 12, which equals to n6 configured for CCE AL 16.

FIG. 13 illustrates a further exemplary configuration for a total number of PDCCH candidates in accordance with some embodiments of the present application. The embodiments of FIG. 13 show a specific application of a total number of PDCCH candidates computed by the embodiments of FIG. 12.

The search apace set configuration for the embodiments of FIG. 13 is similar to that of the embodiments of FIG. 5. For example, a PDCCH search space includes four MOs, i.e., A, B, C, and D, in time and frequency domains; $R_{max}$=4; and values for $R_i$ are R1=1, R2=2, and R3=4, respectively.

The embodiments of FIG. 13 suppose enabling a PDCCH repetition. In accordance with results computed for R1 as shown in the second column of the table in FIG. 12, a sum of total numbers of PDCCH candidates for R1 for all CCE ALs is 0+0+3+2+3=8. That is, there are total 8 PDCCH candidates for each signal MO, for example, for R1=1 in A, for R1=1 in B, and for R1=1 in C or D, as shown in FIG. 13.

In accordance with results computed for R2 as shown in the third column of the table in FIG. 12, a sum of total numbers of PDCCH candidates for R2 for all CCE ALs is 0+0+1+1+2=4. Thus, there are 4 PDCCH candidates in total for two MOs, for example, for R2=2 in A+B, and for R2=2 in C+D, as shown in FIG. 13.

In accordance with results computed for R3 as shown in the fourth column of the table in FIG. 12, a sum of total numbers of PDCCH candidates for R3 for all CCE ALs is 0+0+1+0+1=2. Thus, there are 2 PDCCH candidates in total for four MOs, for example, for R3=4 in A+B+C+D, as shown in FIG. 13.

In the scenario of enabling a PDCCH repetition, a number sum of total numbers of PDCCH candidates for signal MO A, signal MO B, signal MO C, signal MO D, a combination MO of A+B, C+D, and A+B+C+D is 42 at end of MO D. Thus, according to a search space set configuration in FIG. 13, a UE needs to blindly detect up to 42 PDCCH candidates in the search space in a scenario of enabling a PDCCH repetition. Clearly, the embodiments of FIG. 13 reduce blind detection complexity of a UE, compared with the embodiments of FIG. 5.

Figures 14, 15:
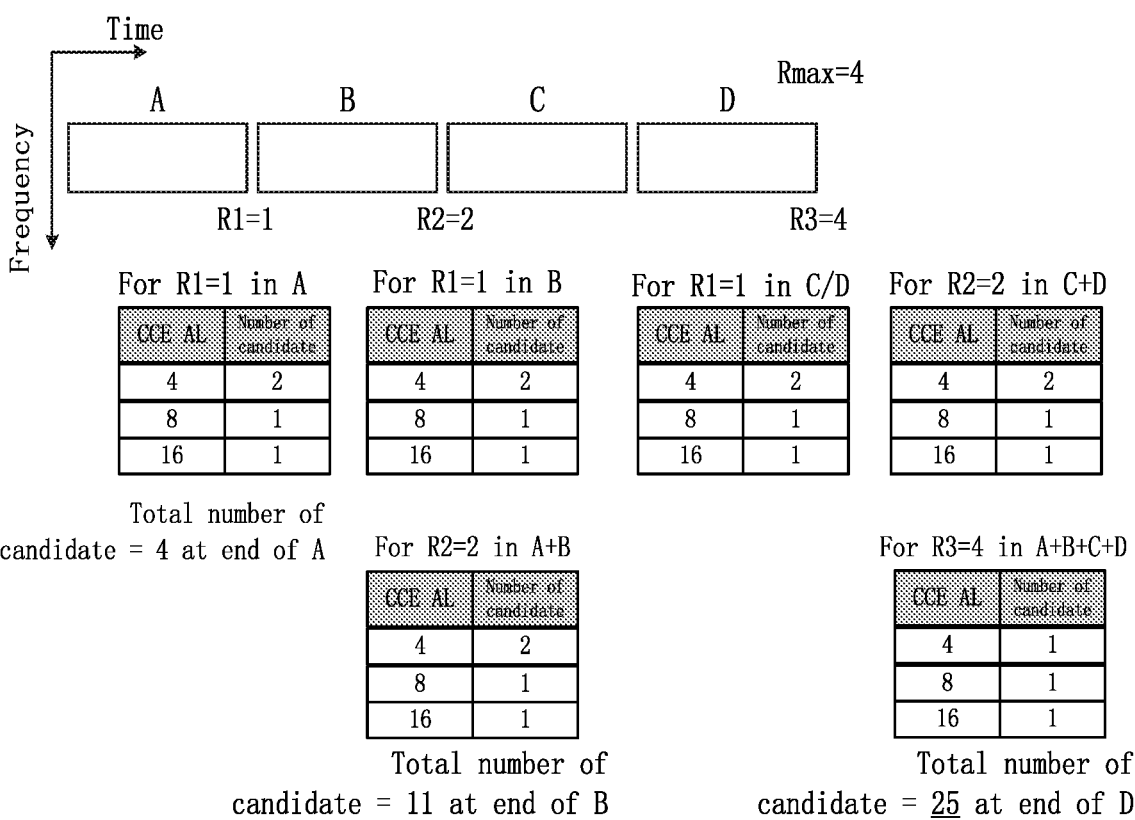
FIG. 14 illustrates a further exemplary configuration of PDCCH candidate number in accordance with some embodiments of the present application.
FIG. 15 illustrates an additional exemplary configuration for a total number of PDCCH candidates in accordance with some embodiments of the present application.

FIG. 14 illustrates a further exemplary configuration of PDCCH candidate number in accordance with some embodiments of the present application. The embodiments of FIG. 14 use Method 3. The embodiments of FIG. 14 use an order of first-$R_i$-second-AL to number multiple cases, each case corresponds to a different repetition level(s) and different CCE AL(s), and each CCE AL corresponds to a non-zero number of PDCCH candidate(s).

The row and column configuration for the embodiments of FIG. 14 are similar to those for the embodiments of FIG. 12. For example, the embodiments of FIG. 14 suppose that the number of PDCCH candidates for CCE AL {1, 2, 4, 8, 16} is configured as 0, 0, 5, 3, 6. The embodiments of FIG. 14 suppose that repetition levels $R_i$ include R1, R2, R3, and R4.

According to the embodiments of FIG. 14, the number of AL configured candidate number is not 0 is 3, i.e., Z=3; and a maximum total number of repetition level is 4, i.e., W=4. Thus, a scaling factor is $$\frac{1}{3 \times 4} = \frac{1}{12}$$

for AL whose configured PDCCH candidate number is non-zero. A sum of configured candidates for every CCE AL by high layer signaling is 14, and so Y=14. Based on Method 3, according to equations (7) and (8), a total number of PDCCH candidates for $R_i$ is shown in FIG. 14.

In particular, according to equations (7) and (8), for both CCE ALs 1 and 2, a total number of PDCCH candidates for each of R1, R2, R3, and R4 is 0, as shown in FIG. 14. According to equations (7) and (8), for CCE AL 4, a total number of PDCCH candidates for R1, R2, R3 and R4 are 2, 2, 1, and 1, respectively; for CCE AL 8, a total number of PDCCH candidates for R1, R2, R3 and R4 are 1, 1, 1, and 1, respectively; and for CCE AL 16, a total number of PDCCH candidates for R1, R2, R3 and R4 are 1, 1, 1, and 1, respectively. These results are shown in the dotted line box of FIG. 14, and their sum is 14, which equals to a sum of n5+n3+n6=14 configured for the CCE ALs.

FIG. 15 illustrates an additional exemplary configuration for a total number of PDCCH candidates in accordance with some embodiments of the present application. The embodiments of FIG. 15 show a specific application of a total number of PDCCH candidates computed by the embodiments of FIG. 14.

The search apace set configuration for the embodiments of FIG. 15 is similar to those of the embodiments of FIGS. 5 and 13. For example, a PDCCH search space includes four MOs, i.e., A, B, C, and D, in time and frequency domains; $R_{max}$=4; and values for $R_i$ are R1=1, R2=2, and R3=4, respectively.

The embodiments of FIG. 15 suppose enabling a PDCCH repetition. In accordance with results computed for R1 as shown in the second column of the table in FIG. 14, a sum of total numbers of PDCCH candidates for R1 for all CCE ALs is 0+0+2+1+1=4. That is, there are 4 PDCCH candidates in total for each signal MO, for example, for R1=1 in A, for R1=1 in B, and for R1=1 in C or D, as shown in FIG. 15.

In accordance with results computed for R2 as shown in the third column of the table in FIG. 14, a sum of total numbers of PDCCH candidates for R2 for all CCE ALs is 0+0+2+1+1=4. Thus, there are 4 PDCCH candidates in total for two MOs, for example, for R2=2 in A+B, and for R2=2 in C+D, as shown in FIG. 15.

In accordance with results computed for R3 as shown in the fourth column of the table in FIG. 12, a sum of total numbers of PDCCH candidates for R3 for all CCE ALs is 0+0+1+1+1=3. Thus, there are 3 PDCCH candidates in total for four MOs, for example, for R3=4 in A+B+C+D, as shown in FIG. 15.

In the scenario of enabling a PDCCH repetition, a number sum of total numbers of PDCCH candidates for signal MO A, signal MO B, signal MO C, signal MO D, a combination MO of A+B, C+D, and combination MO of A+B+C+D is 25 at end of MO D. Thus, according to a search space set configuration in FIG. 15, a UE needs to blindly detect up to 25 PDCCH candidates in the search space in a scenario of enabling a PDCCH repetition. Clearly, the embodiments of FIG. 15 reduce blind detection complexity of a UE, compared whit the embodiments of FIG. 5.

FIG. 16 illustrates an additional exemplary configuration of PDCCH candidate number in accordance with some embodiments of the present application. The embodiments of FIG. 16 use Method 4. The row and column configuration for the embodiments of FIG. 16 are similar to those for the embodiments of FIGS. 12 and 14.

According to Method 4, a number of PDCCH candidates for $R_i$ at a CCE AL are determined by FIG. 16. As shown in FIG. 16, for both CCE AL 4, a total number of PDCCH candidates for R1, R2, R3, and R4 are 1, 0, 0, and 0, respectively; for CCE AL 8, a total number of PDCCH candidates for R1, R2, R3 and R4 are 1, 1, 0, and 0, respectively; and for CCE AL 16, a total number of PDCCH candidates for R1, R2, R3 and R4 are 1, 1, 1, and 1, respectively.

FIG. 17 illustrates a block diagram of an exemplary apparatus in accordance with some embodiments of the present application. Referring to FIG. 17, the apparatus 1700 includes a receiving circuitry 1702, a transmitting circuitry 1704, a processor 1706, and a non-transitory computer-readable medium 1708. The processor 1706 is coupled to the non-transitory computer-readable medium 1708, the receiving circuitry 1702, and the transmitting circuitry 1704.

It is contemplated that some components are omitted in FIG. 17 for simplicity. In some embodiments, the receiving circuitry 1702 and the transmitting circuitry 1704 may be integrated into a single component (e.g., a transceiver).

In some embodiments, the non-transitory computer-readable medium 1708 may have stored thereon computer-executable instructions to cause a processor to implement the operations with respect to UE(s) as described above. For example, upon execution of the computer-executable instructions stored in the non-transitory computer-readable medium 1708, the processor 1706 and the receiving circuitry 1702 performs the method of FIG. 6, including: the receiving circuitry 1702 receives CCE AL information in a search space set configuration; the processor 1706 determines a scaling factor for each of repetition levels of a maximum repetition number, wherein the maximum repetition number corresponds to a total number of MOs within a set of MOs; the processor 1706 computes a number of PDCCH candidates to be monitored for each of the repetition levels based on the CCE AL information and the scaling factor for each of the repetition levels, and the receiving circuitry 1702 receives a control signal on the PDCCH candidates.

The method of the present application can be implemented on a programmed processor. However, the controllers, flowcharts, and modules may also be implemented on a general purpose or special purpose computer, a programmed microprocessor or micro-controller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in random access memory (RAM) memory, flash memory, Read Only Memory (ROM), Erasable Programmable Read-Only memory (EPROM), Electrically Erasable Programmable read only memory (EEPROM), registers, a hard disk, a removable disk, a Compact Disc Read-Only Memory (CD-ROM), or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method, comprising:
   receiving control channel element (CCE) aggregation level (AL) information in a search space set configuration;
   determining a scaling factor for each of repetition levels of a maximum repetition number, the maximum repetition number corresponding to a total number of monitor occasions (MOs) within a set of MOs;
   computing a number of physical downlink control channel (PDCCH) candidates to be monitored for each of the repetition levels based on the CCE AL information and the scaling factor for each of the repetition levels; and
   receiving a control signal on the PDCCH candidates.

2. The method of claim 1, wherein the CCE AL information includes PDCCH candidate numbers for a plurality of CCE ALs.

3. The method of claim 1, wherein the scaling factor is configured by radio resource control (RRC) signaling.

4. The method of claim 1, wherein the scaling factor is determined by:
   a total number of one or more CCE ALs corresponding to a non-zero candidate number in the search space set configuration; and
   a maximum total number of the repetition levels.

5. The method of claim 1, wherein the number of PDCCH candidates to be monitored for each of the repetition levels is computed based on a sum of PDCCH candidate numbers for a plurality of CCE ALs.

6. The method of claim 1, wherein the number of PDCCH candidates to be monitored for each of the repetition levels is computed based on a PDCCH candidate number for each of CCE AL and the scaling factor.

7. The method of claim 1, wherein a start position of the set of MOs within a slot is determined at least based on:
   a start position of a first MO in a search space set associated with the search space set configuration;
   the total number of MOs within the set of MOs; and
   an offset.

8. The method of claim 1, wherein a total number of each of the repetition levels is determined by:
   a total set number of one or more sets of the MOs within in a search space set associated with the search space set configuration;
   a maximum total number of the MOs within the set of MOs; and
   a total number of the MOs in each of the repetition levels.

9. An apparatus, comprising:
   a receiving circuitry;
   a transmitting circuitry; and
   a processor coupled to, the circuitry configured to:
     receive control channel element (CCE) aggregation level (AL) information in a search space set configuration;
     determine a scaling factor for each of repetition levels of a maximum repetition number that corresponds to a total number of monitor occasions (MOs) within a set of MOs;
     compute a number of physical downlink control channel (PDCCH) candidates to be monitored for each of the repetition levels based on the CCE AL information and the scaling factor for each of the repetition levels; and
     receive a control signal on the PDCCH candidates.

10. The apparatus of claim 9, wherein the CCE AL information includes PDCCH candidate numbers for a plurality of CCE ALs.

11. The apparatus of claim 9, wherein the scaling factor is configured by radio resource control (RRC) signaling.

12. The apparatus of claim 9, wherein the scaling factor is determined by:
    a total number of one or more CCE ALs corresponding to a non-zero candidate number in the search space set configuration; and
    a maximum total number of the repetition levels.

13. The apparatus of claim 9, wherein the number of PDCCH candidates to be monitored for each of the repetition levels is computed based on a sum of PDCCH candidate numbers for a plurality of CCE ALs.

14. The apparatus of claim 9, wherein the number of PDCCH candidates to be monitored for each of the repetition levels is computed based on a PDCCH candidate number for each of CCE AL and the scaling factor.

15. The apparatus of claim 9, wherein a start position of the set of MOs within a slot is determined at least based on:
    a start position of a first MO in a search space set associated with the search space set configuration;
    the total number of MOs within the set of MOs; and
    an offset.

16. The apparatus of claim 9, wherein a total number of each of the repetition levels is determined by:
    a total set number of one or more sets of the MOs within in a search space set associated with the search space set configuration;
    a maximum total number of the MOs within the set of MOs; and
    a total number of the MOs in each of the repetition levels.

17. An apparatus, comprising:
    a receiving circuitry;
    a transmitting circuitry; and
    a processor coupled to the receiving circuitry and the transmitting circuitry configured to:
      transmit control channel element (CCE) aggregation level (AL) information in a search space set configuration;

determine a scaling factor for each of repetition levels of a maximum repetition number that corresponds to a total number of monitor occasions (MOs) within a set of MOs;

compute a number of physical downlink control channel (PDCCH) candidates to be monitored for each of the repetition levels based on the CCE AL information and the scaling factor for each of the repetition levels; and transmit a control signal on the PDCCH candidates.

18. The apparatus of claim 17, wherein the CCE AL information includes PDCCH candidate numbers for a plurality of CCE ALs.

19. The apparatus of claim 17, wherein the scaling factor is configured by radio resource control (RRC) signaling.

20. The apparatus of claim 17, wherein the scaling factor is determined by:

a total number of one or more CCE ALs corresponding to a non-zero candidate number in the search space set configuration; and a maximum total number of the repetition levels.

* * * * *